United States Patent [19]
Itoh

[11] Patent Number: 5,687,027
[45] Date of Patent: Nov. 11, 1997

[54] ZOOM LENS FOR OPTICAL APPARATUS SUCH AS CAMERA

[75] Inventor: Yoshinori Itoh, Kanagawa-ken, Japan

[73] Assignee: Canon Kabushiki Kaisha, Tokyo, Japan

[21] Appl. No.: 607,640

[22] Filed: Feb. 27, 1996

[30] Foreign Application Priority Data

Mar. 2, 1995 [JP] Japan .................. 7-068827

[51] Int. Cl.$^6$ .................. G02B 15/14; G02B 13/18
[52] U.S. Cl. .................. 359/692; 359/717
[58] Field of Search .................. 359/692, 717, 359/690, 688, 687

[56] References Cited

U.S. PATENT DOCUMENTS

| | | | |
|---|---|---|---|
| 4,659,186 | 4/1987 | Sato et al. | 350/423 |
| 4,682,860 | 7/1987 | Tanaka et al. | 350/423 |
| 4,836,660 | 6/1989 | Ito | 359/692 |
| 4,838,669 | 6/1989 | Ogata et al. | 350/427 |
| 4,909,613 | 3/1990 | Kikuchi | 350/423 |
| 5,113,287 | 5/1992 | Nakayama | 359/676 |
| 5,175,650 | 12/1992 | Takayama et al. | 359/716 |
| 5,218,478 | 6/1993 | Itoh | 359/692 |
| 5,229,887 | 7/1993 | Hayashi et al. | 359/692 |
| 5,274,504 | 12/1993 | Itoh | 359/676 |
| 5,305,148 | 4/1994 | Ikemori et al. | 359/689 |
| 5,365,376 | 11/1994 | Itoh | 359/686 |

FOREIGN PATENT DOCUMENTS

| | | |
|---|---|---|
| 57-201213 | 12/1982 | Japan . |
| 60-170816 | 9/1985 | Japan . |
| 60-191216 | 9/1985 | Japan . |
| 62-56917 | 3/1987 | Japan . |
| 62-284319 | 12/1987 | Japan . |
| 63-256915 | 10/1988 | Japan . |
| 1-193807 | 8/1989 | Japan . |
| 64-52111 | 8/1989 | Japan . |
| 2-50118 | 2/1990 | Japan . |
| 2-71220 | 3/1990 | Japan . |
| 2-190812 | 7/1990 | Japan . |
| 3-20734 | 3/1991 | Japan . |
| 4-247 | 1/1992 | Japan . |
| 4-145408 | 5/1992 | Japan . |

Primary Examiner—David C. Nelms
Assistant Examiner—John P. Cornely
Attorney, Agent, or Firm—Fitzpatrick, Cella, Harper & Scinto

[57] ABSTRACT

To attain a compact wide-angle 2-unit zoom lens having a variable magnification range of 2.6 to 2.9 or thereabout which is well corrected for high optical performance throughout the entire variable magnification range with the total length shortened, the zoom lens comprises, in order from the object side, a first lens unit of positive refractive power and a second lens unit of negative refractive power, the separation between both the first and second lens units being varied to vary magnification, wherein an aspheric surface layer is formed on a lens surface of the object side among the lenses made of glass in the second lens unit by coating that lens surface with transparent resin and then setting the transparent resin.

28 Claims, 10 Drawing Sheets

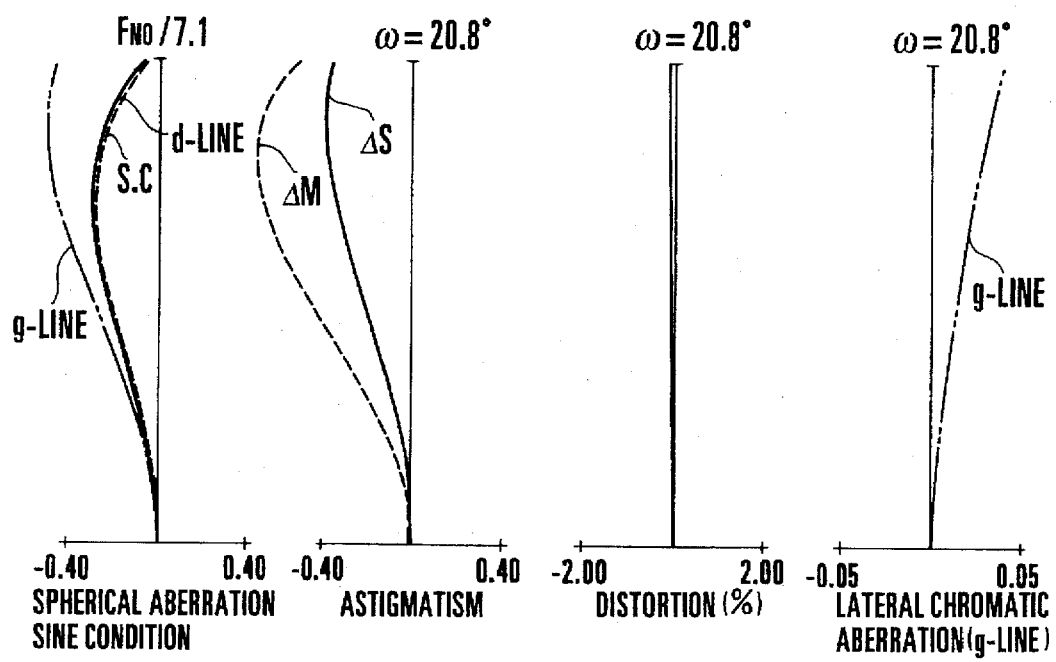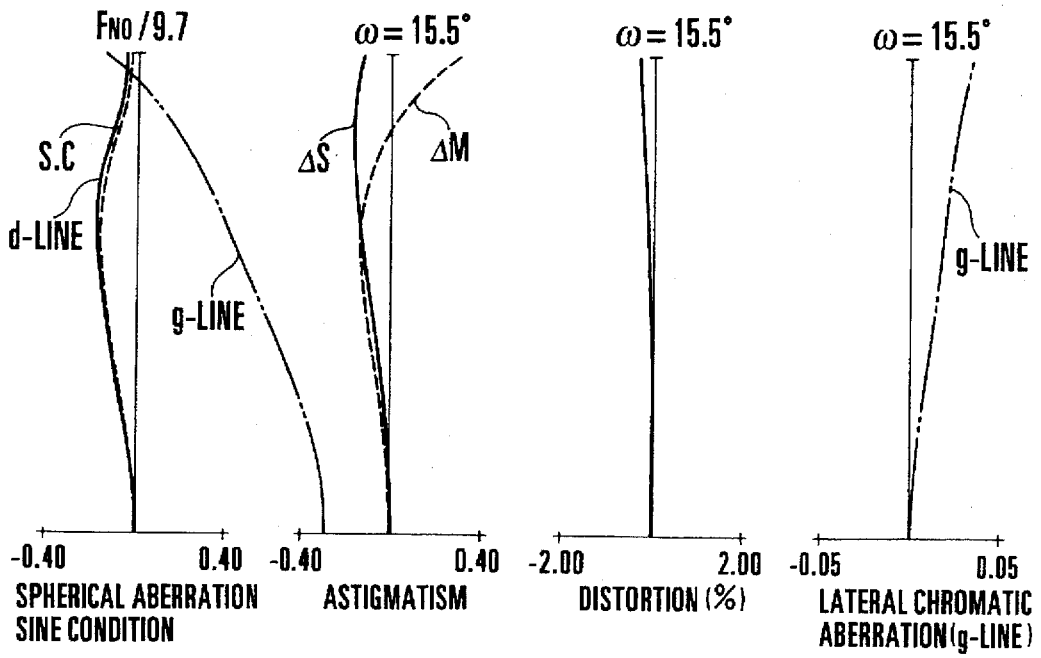

ZOOM LENS FOR OPTICAL APPARATUS SUCH AS CAMERA

BACKGROUND OF THE INVENTION

1. Field of the Invention

This invention relates to zoom lenses suited to lens shutter cameras, video cameras or the like and optical apparatuses such as cameras having those zoom lenses and, more particularly, to zoom lenses of as wide an angle of field as 60 to 70 degrees at the wide-angle end of the range and a variable magnification ratio of 2.6 to 2.9 and optical apparatuses such as cameras having those zoom lenses.

2. Description of the Related Art

Recently, as the lens shutter cameras and video cameras have decreased in bulk and size, there is a demand for zoom lenses with the total length shortened to a minimum. Particularly even in the field of compact cameras such as lens shutter cameras of no interchangeable lenses, zoom lenses are desired to be mounted. Accordingly, the zoom lens to be employed is desired to have an almost equal physical length to that of the mono-focal length lenses.

In Japanese Laid-Open Patent Applications Nos. Sho 57-201213, Sho 60-170816, Sho 60-191216, Sho 62-56917, etc., there is proposed a compact form of the zoom lens comprising, in order from the object side, a first lens unit of positive refractive power and a second lens unit of negative refractive power with the separation between the first and second lens units made variable for varying magnification, or so-called 2-unit zoom lens.

In these publications, by employing the plus-minus refractive power arrangement in this order from the object side, and getting a relatively short back focal distance, the 2-unit zoom lens of shortened total length is achieved while still maintaining high optical performance.

Besides these, Japanese Laid-Open Patent Applications Nos. Sho 62-284319, Sho 63-256915, Sho 64-52111, Hei 1-193807, etc., disclose a 2-unit zoom lens comprising a first lens unit of positive refractive power and a second lens unit of negative refractive power, variation of magnification being performed by axially moving both of the first and second lens units forward while varying the separation between the first and second lens units.

In addition, Japanese Laid-Open Patent Applications Nos. Hei 2-50118, Hei 2-71220, Hei 2-190812, Hei 4-145408, etc., disclose a 2-unit zoom lens of relatively high range comprising a first lens unit of positive refractive power and a second lens unit of negative refractive power with the separation between the first and second lens units made variable for varying magnification.

In the 2-unit zoom lens comprising the first lens unit of positive refractive power and the second lens Unit of negative refractive power described above, to increase the angle of field for the wide-angle setting to a value of 60 to 74 or thereabout with the limitation of the size of the entire lens system to a minimum and, at the same time, to increase the variable magnification ratio to a value of about 2.6, while still permitting good optical performance to be obtained throughout the entire variable magnification range, there is need to set forth proper rules of design for each lens unit.

In the prior known zoom lenses of, for example, the above Japanese Laid-Open Patent Applications Nos. Sho 57-201213 and Hei 1-193807, the zoom ratio is as low as about 1.5. Also, in the zoom lens of the above Japanese Laid-Open Patent Application No. Sho 63-256915, aberrations, particularly, spherical aberration and curvature of field, caused by the variation of magnification vary to a large extent.

In general, if both of the first and second lens units are made to have stronger focal lengths, it becomes easier to increase the variable magnification range, and, each lens unit gets a lesser amount of movement during the variation of magnification, so that the shortening of the total length of the entire lens becomes possible. However, mere strengthening of the refractive power of each lens unit results in a larger variation of aberrations with zooming, which is difficult to correct well. Therefore, a zoom lens having high optical performance cannot be obtained.

SUMMARY OF THE INVENTION

An object of the invention is to provide an image forming optical system such as a zoom lens having high optical performance and a camera equipped with the image forming optical system such as a zoom lens having high optical performance.

An image forming optical system according to the invention comprises a first lens unit having a positive refractive power and a second lens unit located on an image side of the first lens unit and having a negative refractive power, wherein an aspheric surface layer having an aspheric surface is formed on a surface of a certain lens of the optical system.

A first form of zoom lens according to the invention comprises a first lens unit having a positive refractive power and a second lens unit located on an image side of the first lens unit and having a negative refractive power, wherein magnification is varied by varying a separation between the first lens unit and the second lens unit, and wherein an aspheric surface layer made of resin and having an aspheric surface is formed on a surface of an object side of a glass lens of the second lens unit.

A second form of zoom lens according to the invention comprises a first lens unit having a positive refractive power and having, in order from an object side, a positive lens of which a surface of the object side is a convex surface, a negative lens of which a surface of the object side is a concave surface and two positive lenses of which respective surfaces of an image side are convex surfaces, and a second lens unit located on the image side of the first lens unit, having a negative refractive power and having, in order from the object side, a positive meniscus lens convex toward the image side and a negative meniscus lens convex toward the image side, an aspheric surface layer made of resin and having an aspheric surface being formed on a surface of the object side of one of the positive meniscus lens and the negative meniscus lens, wherein magnification is varied by varying a separation between the first lens unit and the second lens unit, and wherein, letting the Abbe number of the positive meniscus lens be denoted by $\nu 21$, the Abbe number of the aspheric surface layer by $\nu A1$, the axial thickness of the aspheric surface layer by $DA1$, the focal length at a telephoto end of the entire zoom lens by $fT$, and the image forming magnifications for a wide-angle end and the telephoto end of the second lens unit by $\beta 2W$ and $\beta 2T$, respectively, the following conditions are satisfied:

$$10 < \nu A1 - \nu 21 < 30$$

$$3 \times 10^{-4} < DA1/fT < 2 \times 10^{-3}$$

$$1.8 < \beta 2T/\beta 2W < 4$$

An optical apparatus such as a camera according to the invention comprises one of the image forming optical system, the first form of zoom lens and the second form of zoom lens.

BRIEF DESCRIPTION OF THE DRAWINGS

FIGS. 15A, 15B, 15C and 15D are graphic representations of the aberrations of the numerical example 4 of the invention in an intermediate position.

FIGS. 16A, 16B, 16C and 16D are graphic representations of the aberrations of the numerical example 4 of the invention in the telephoto end.

DETAILED DESCRIPTION OF THE PREFERRED EMBODIMENTS

Figure 1A:
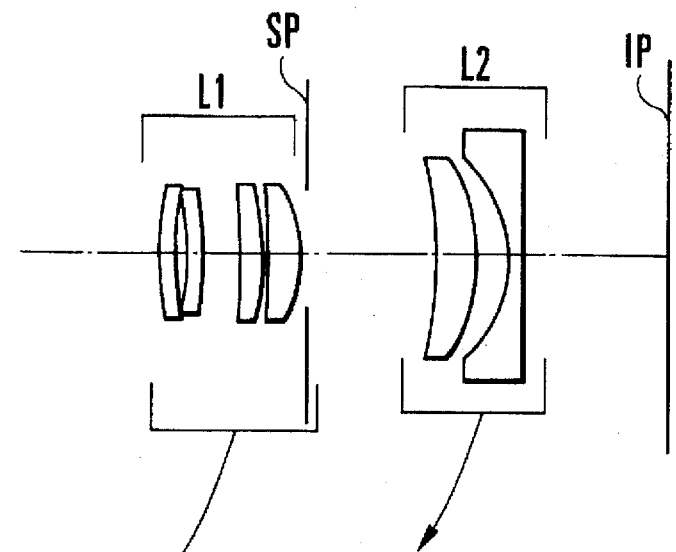
FIGS. 1A, 1B and 1C are lens block diagrams of a numerical example 1 of the invention.
Figure 1B:
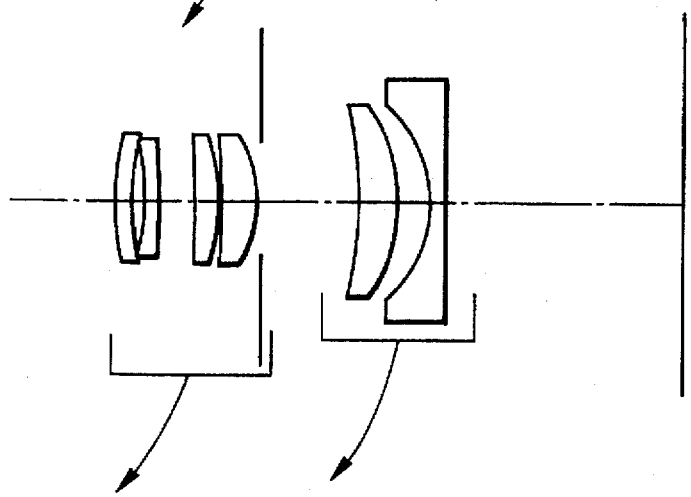
Figure 1C:
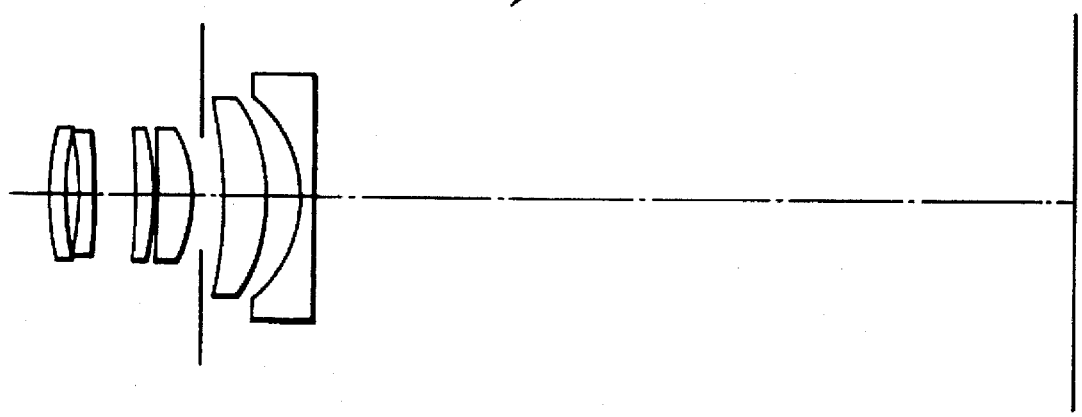
Figure 2A:
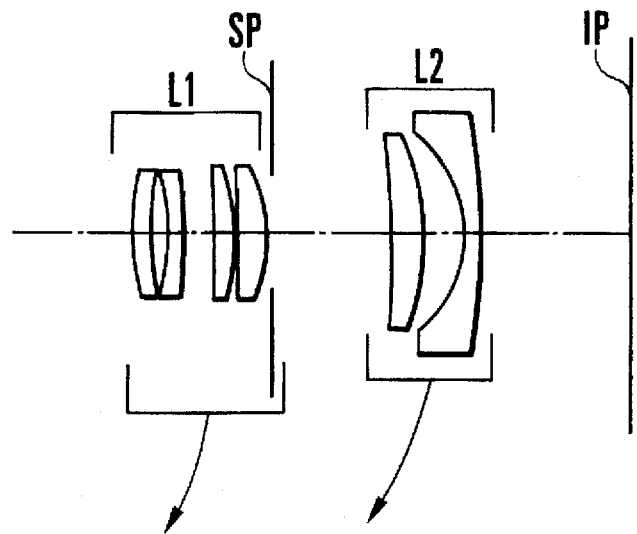
FIGS. 2A, 2B and 2C are lens block diagrams of a numerical example 2 of the invention.
Figure 2B:
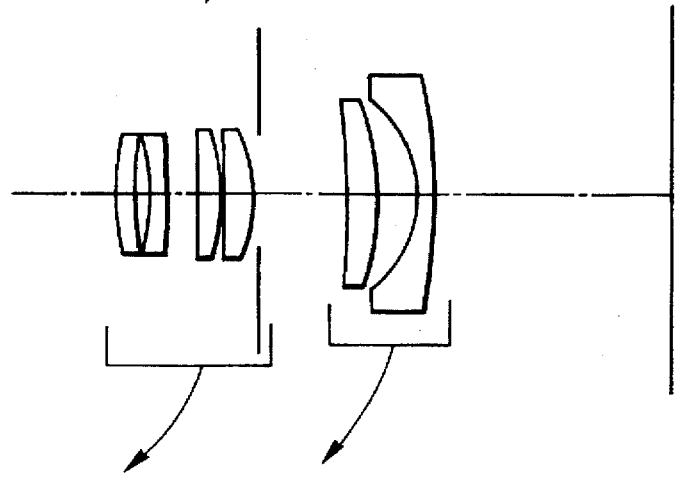
Figure 2C:
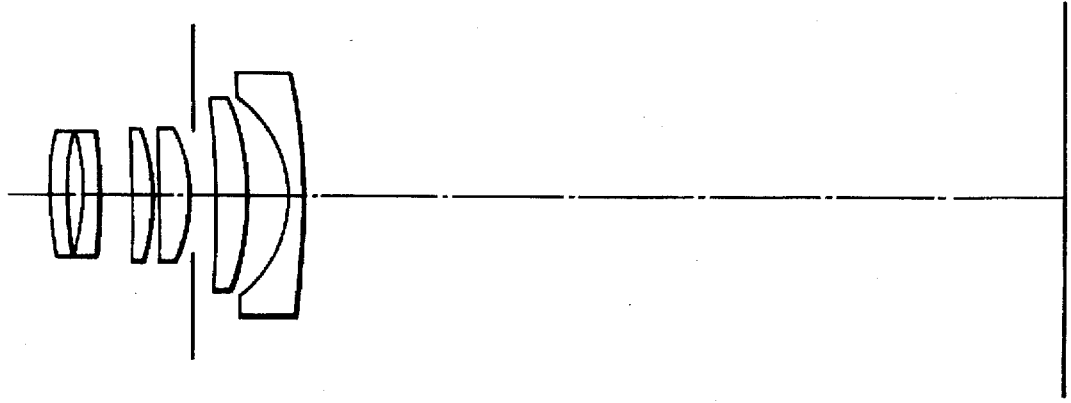
Figure 3A:
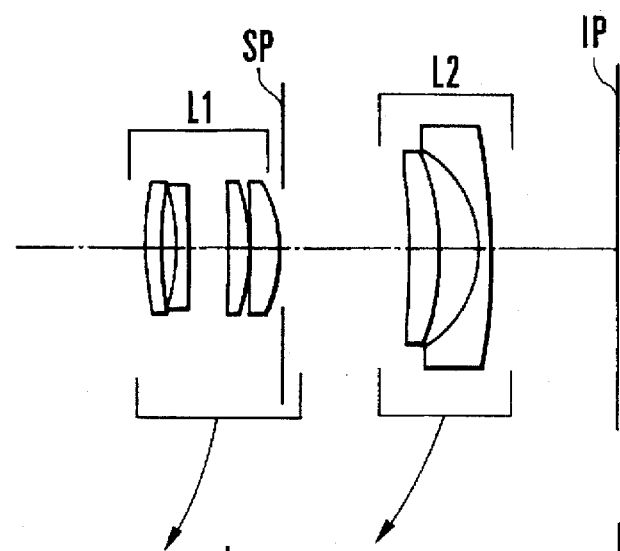
FIGS. 3A, 3B and 3C are lens block diagrams of a numerical example 3 of the invention.
Figure 3B:
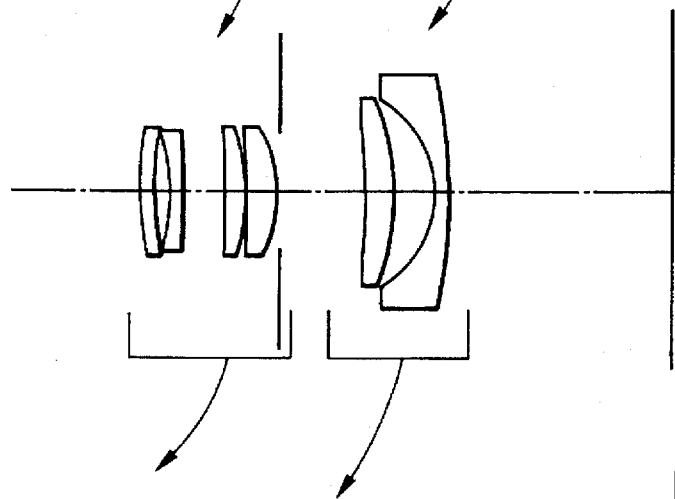
Figure 3C:
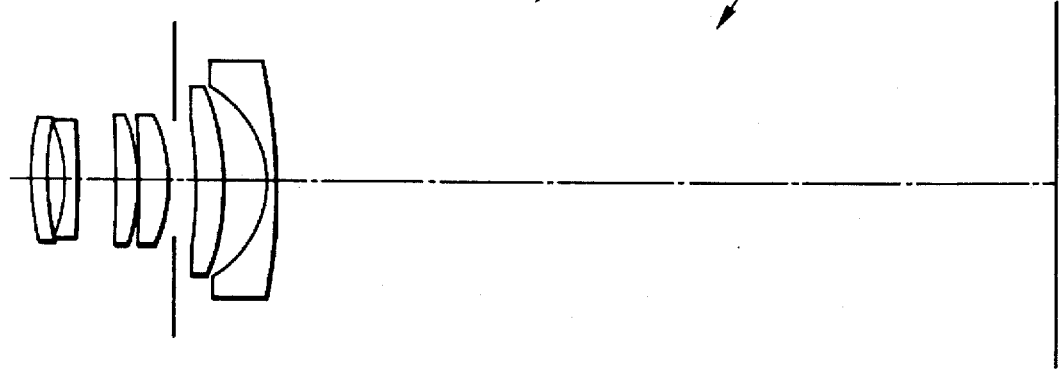
Figure 4A:
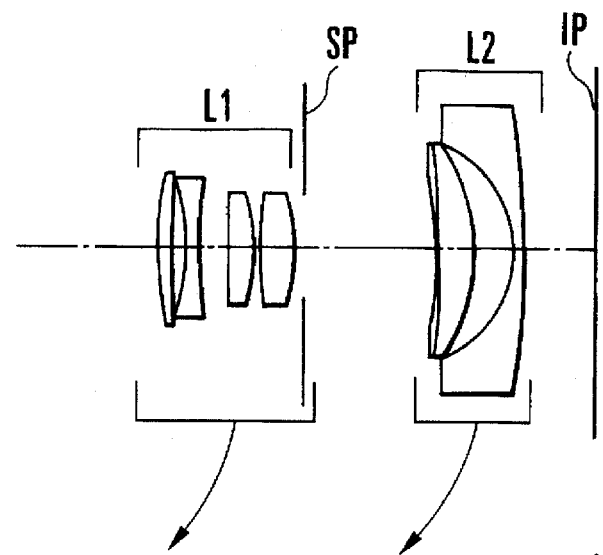
FIGS. 4A, 4B and 4C are lens block diagrams of a numerical example 4 of the invention.
Figure 4B:
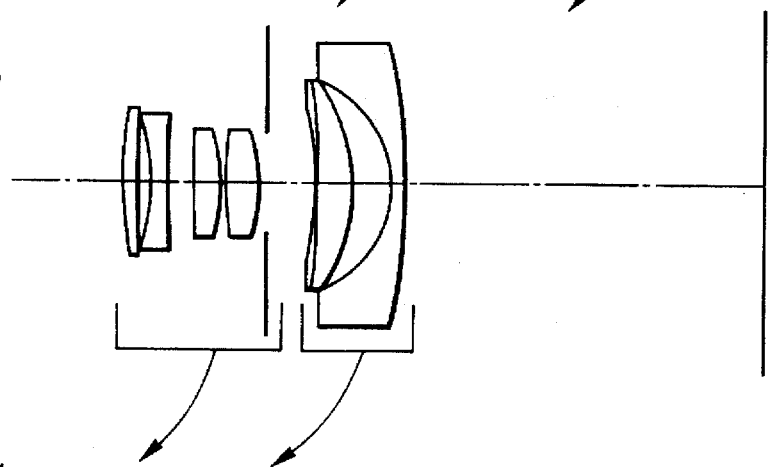
Figure 4C:
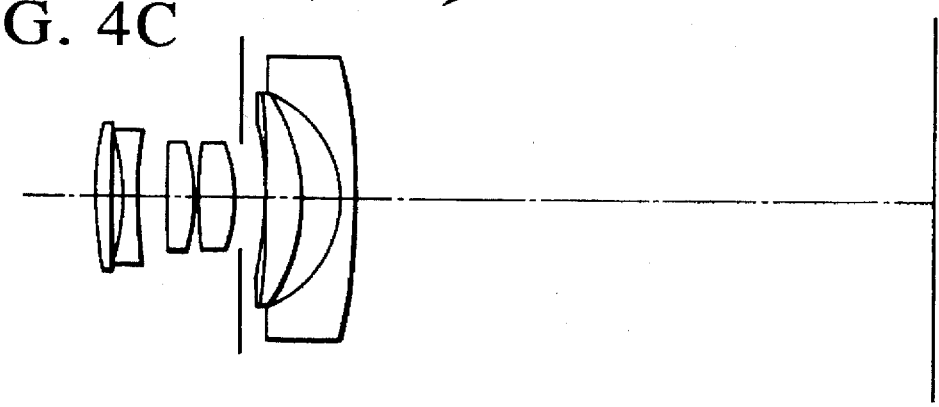
Figures 5A, 5B, 5C, 5D:
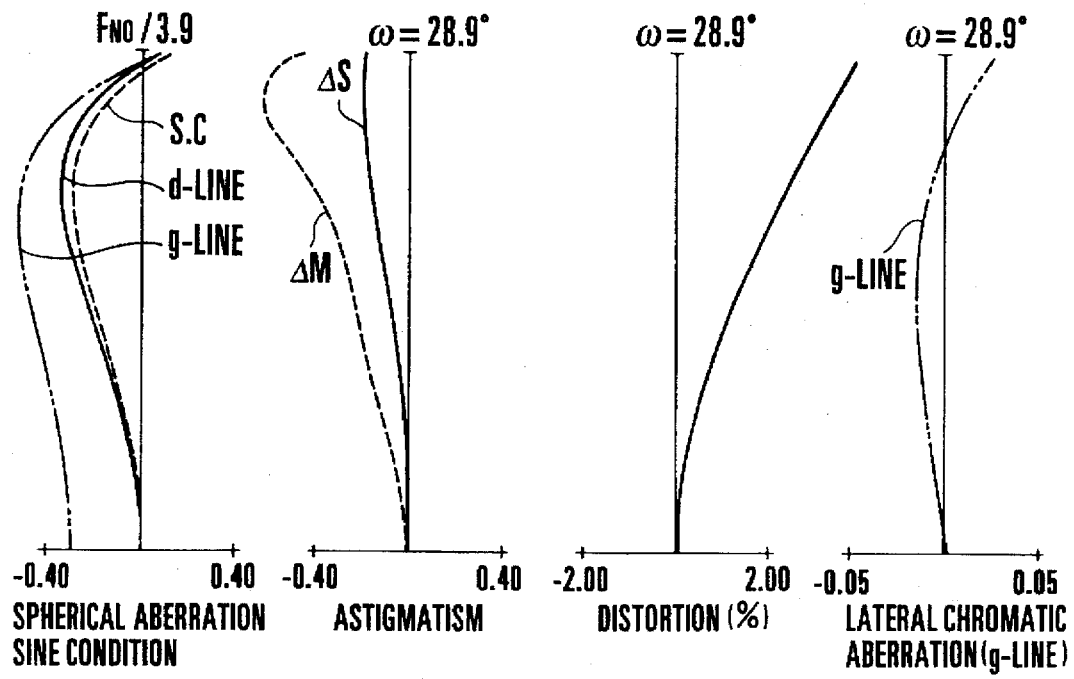
FIGS. 5A, 5B, 5C and 5D are graphic representations of the aberrations of the numerical example 1 of the invention in the wide-angle end.
Figures 6A, 6B, 6C, 6D:
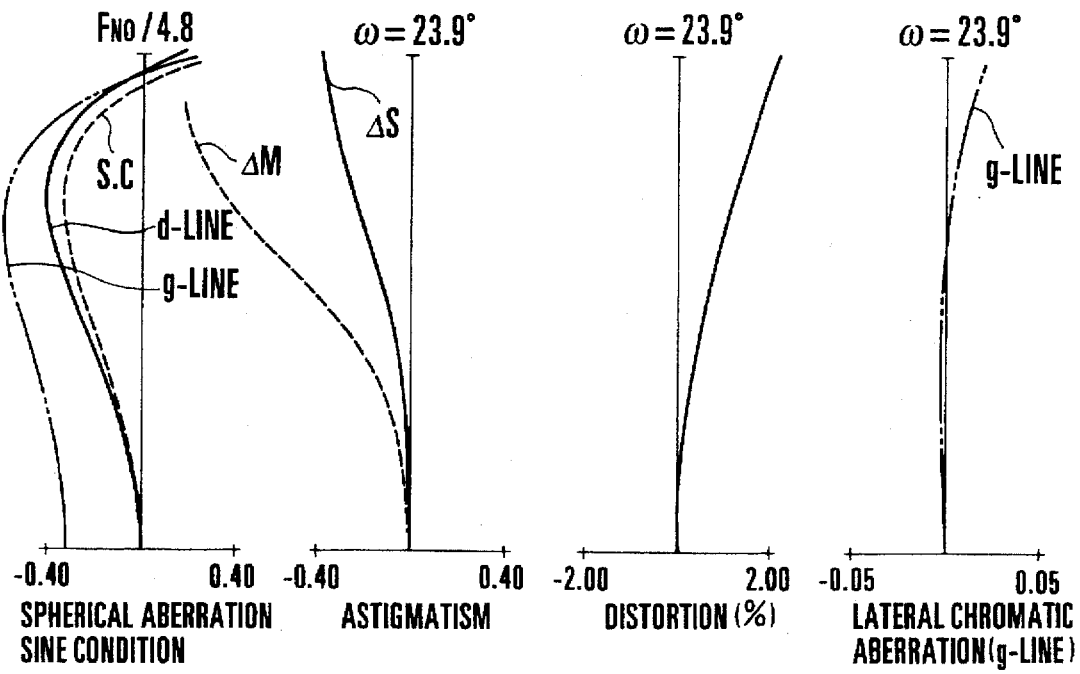
FIGS. 6A, 6B, 6C and 6D are graphic representations of the aberrations of the numerical example 1 of the invention in an intermediate position.
Figures 7A, 7B, 7C, 7D:
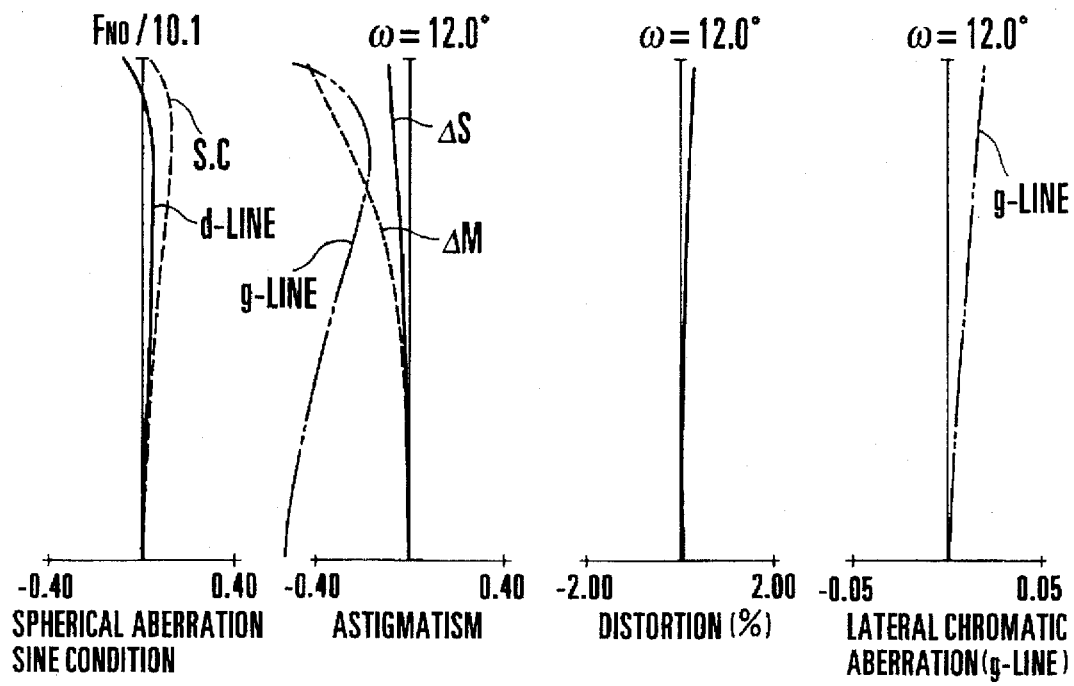
FIGS. 7A, 7B, 7C and 7D are graphic representations of the aberrations of the numerical example 1 of the invention in the telephoto end.
Figures 8A, 8B, 8C, 8D:
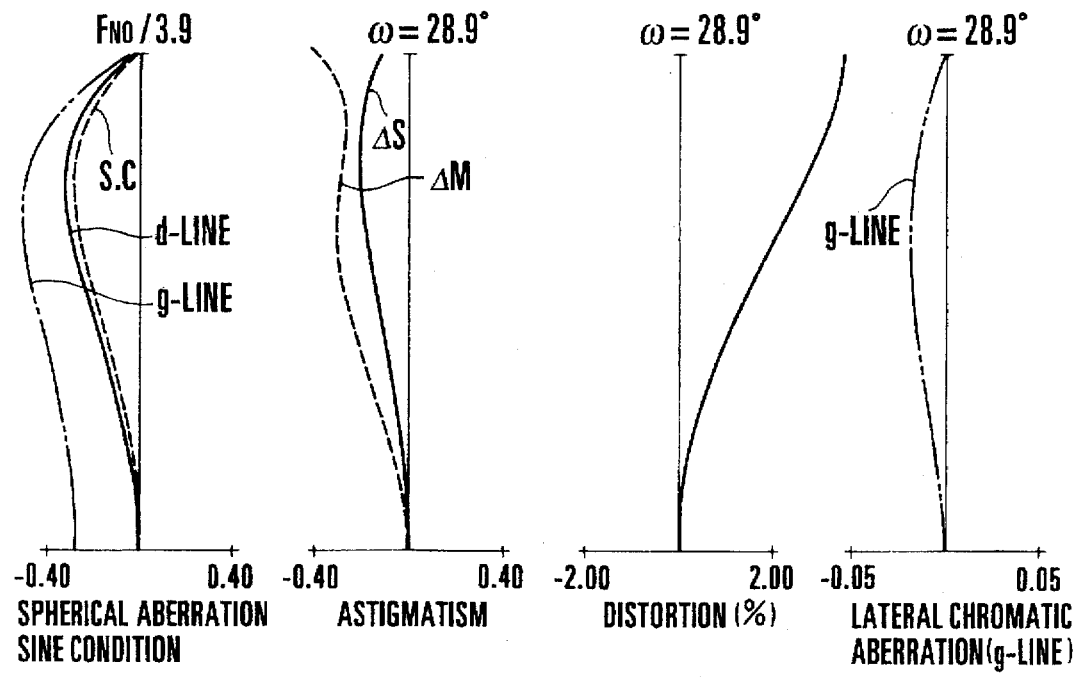
FIGS. 8A, 8B, 8C and 8D are graphic representations of the aberrations of the numerical example 2 of the invention in the wide-angle end.
Figures 9A, 9B, 9C, 9D:
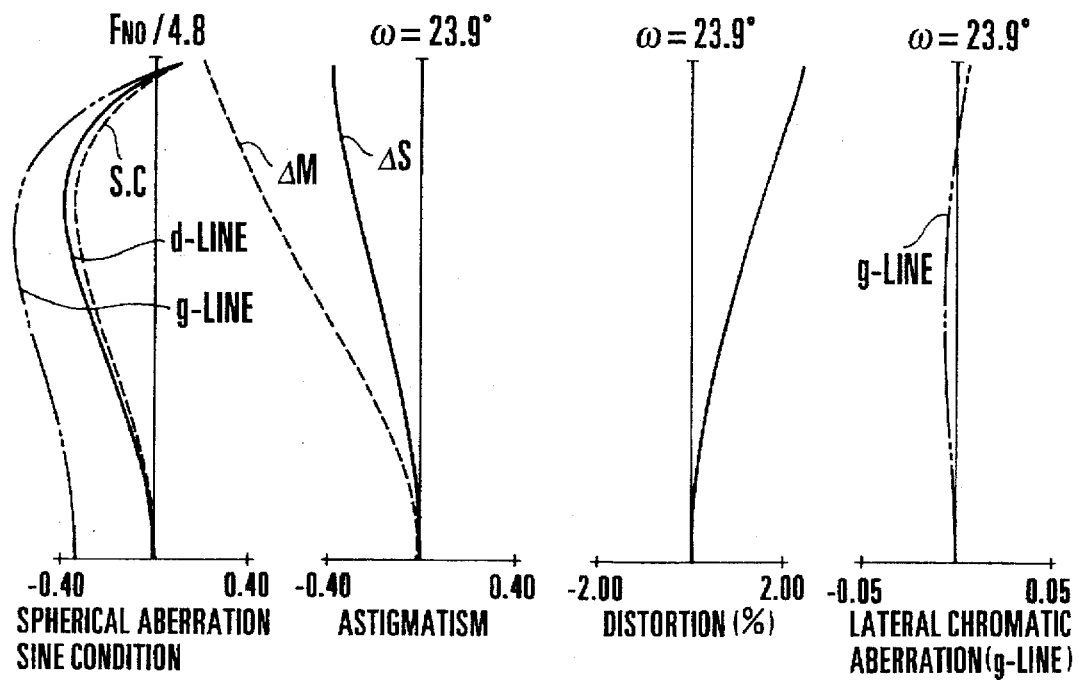
FIGS. 9A, 9B, 9C and 9D are graphic representations of the aberrations of the numerical example 2 of the invention in an intermediate position.
Figures 10A, 10B, 10C, 10D:
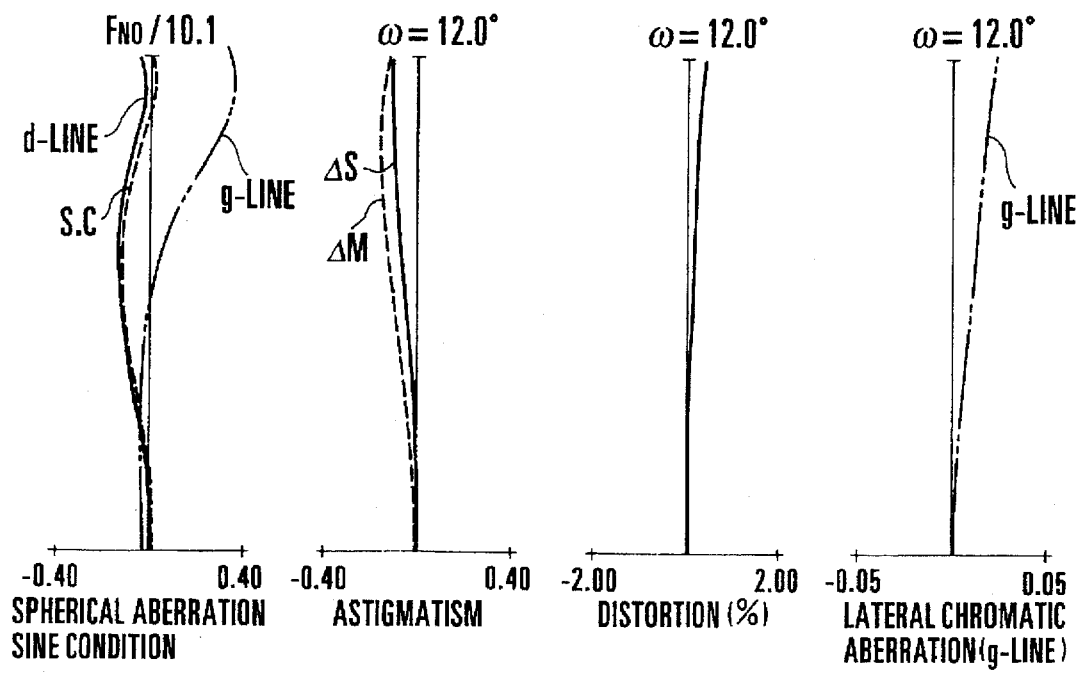
FIGS. 10A, 10B, 10C and 10D are graphic representations of the aberrations of the numerical example 2 of the invention in the telephoto end.
Figures 11A, 11B, 11C, 11D:
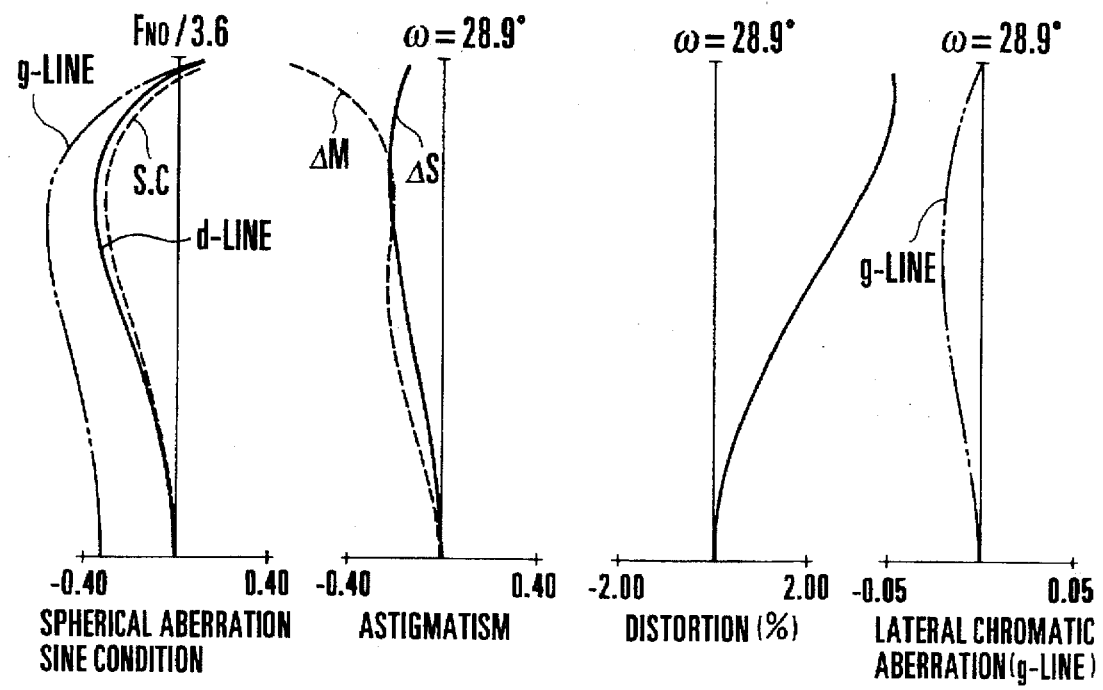
FIGS. 11A, 11B, 11C and 11D are graphic representations of the aberrations of the numerical example 3 of the invention in the wide-angle end.
Figures 12A, 12B, 12C, 12D:
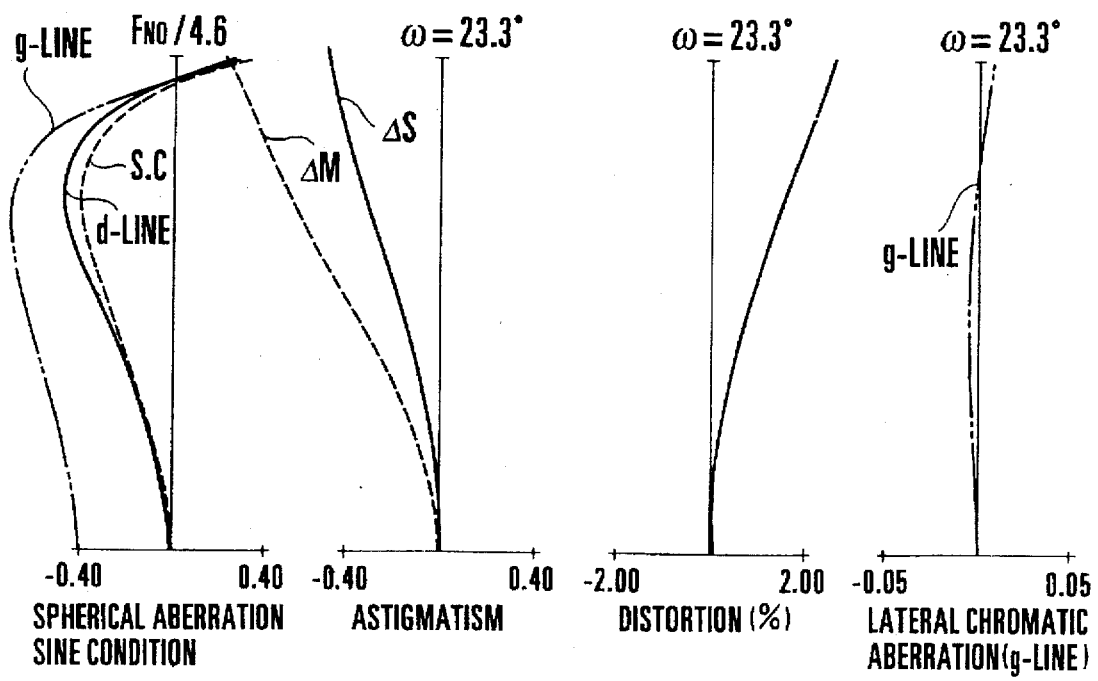
FIGS. 12A, 12B, 12C and 12D are graphic representations of the aberrations of the numerical example 3 of the invention in an intermediate position.
Figures 13A, 13B, 13C, 13D:
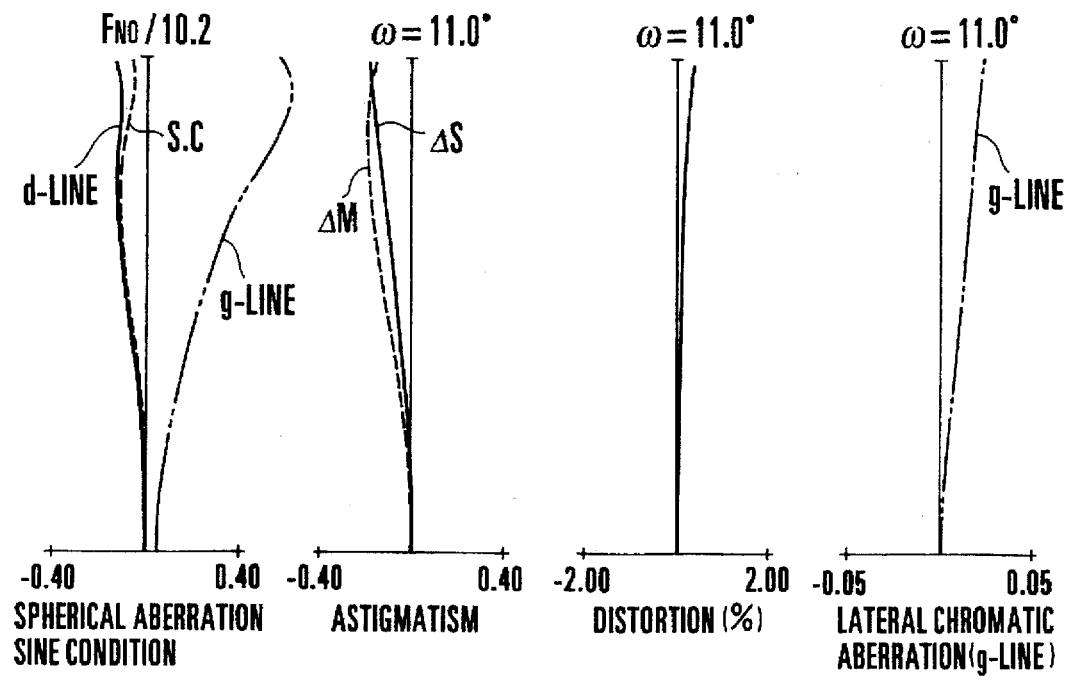
FIGS. 13A, 13B, 13C and 13D are graphic representations of the aberrations of the numerical example 3 of the invention in the telephoto end.
Figures 14A, 14B, 14C, 14D:
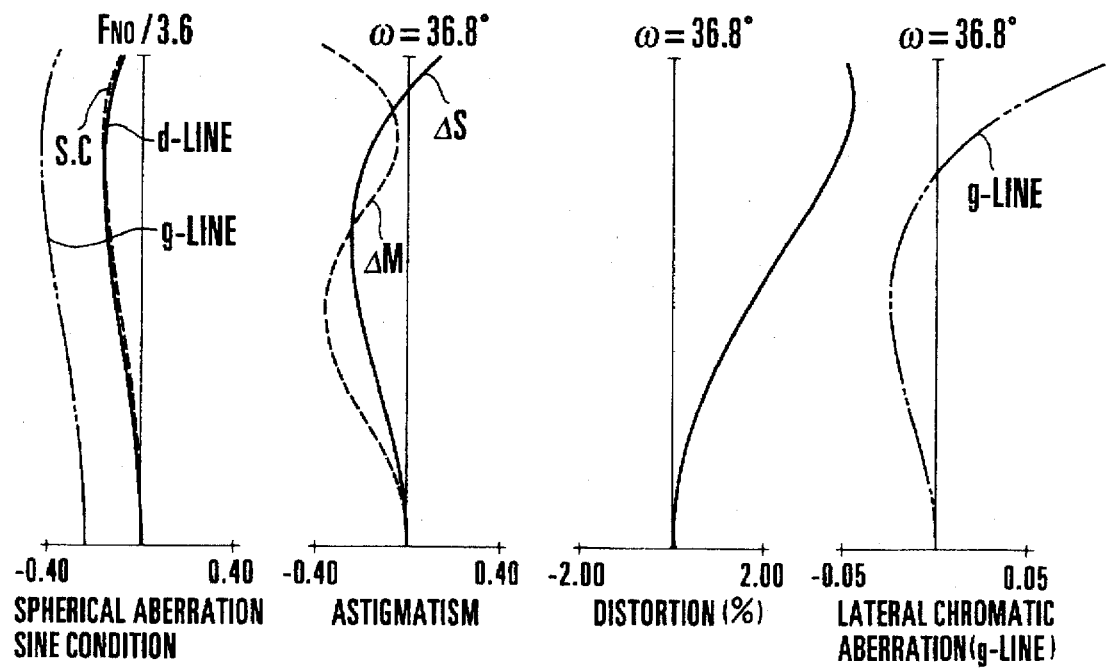
FIGS. 14A, 14B, 14C and 14D are graphic representations of the aberrations of the numerical example 4 of the invention in the wide-angle end.

FIGS. 1A, 1B and 1C to FIGS. 4A, 4B and 4C are lens block diagrams of the numerical examples 1 to 4 of zoom lenses of the invention, respectively. Of the lens block diagrams, the ones of FIGS. 1A, 2A, 3A and 4A are in a zooming position for the wide-angle end, the ones of FIGS. 1B, 2B, 3B and 4B are in another zooming position for the intermediate focal length and the ones of FIGS. 1C, 2C, 3C and 4C are in another zooming position for the telephoto end. The zoom lens according to the present embodiment is held in a lens barrel and, as it stands in this state, mounted to a camera body.

In these drawings, reference character L1 denotes a first lens unit of positive refractive power and reference character L2 denotes a second lens unit of negative refractive power. Both the lens units L1 and L2 axially move toward the object side as indicated by arrows, while simultaneously decreasing the separation between both the lens units L1 and L2, when variation of magnification is carried out from the wide-angle end to the telephoto end. A stop SP moves in unison with the first lens unit L1. IP stands for an image plane, with which the light receiving surface of an image pickup element such as CCD or of silver-halide film is made to coincide.

The second lens unit L2 is constructed with a positive first lens of meniscus form convex toward the image side and a negative second lens of meniscus form convex toward the image side. An aspheric surface layer is formed on a lens surface of the object side among the lenses made of glass in the second lens unit L2 by coating that lens surface with transparent resin and then setting the transparent resin.

In the numerical example 1, the aspheric surface layer made of transparent resin is applied to a concave lens surface of the object side of the second lens in the second lens unit and, in the numerical examples 2 to 4, the aspheric surface layer made of transparent resin is applied to a concave surface of the object side of the first lens in the second lens unit.

In such a manner, the second lens unit L2 is constructed with at least one positive lens and at least one negative lens so that during variation of magnification, the second lens unit L2 produces as small aberrations as possible.

In the 2-unit zoom lens of the invention, to minimize the variation of various aberrations due to variation of magnification, it is advantageous to use an aspherical lens made of high dispersion material in the second lens unit L2. However, the use of high dispersion material increases the difficulty of correcting lateral chromatic aberration in the wide-angle end.

Thus, in the present embodiment, a lens made of a glass material of high dispersion is used and the surface of the object side of that lens is coated with a transparent resin material of low dispersion. Then, by setting the transparent resin material, an aspheric surface layer is formed on that surface. Owing to the aspheric surface layer, the variation of chromatic aberrations and other aberrations due to variation of magnification is corrected well. In addition, the first lens unit L1 is constructed with a positive lens having a convex surface facing the object side, a negative lens having a concave surface facing the object side and two positive lenses having respective convex surfaces facing the image side, thereby obtaining high optical performance over the entire variable magnification range.

In the present embodiment, therefore, by employing such a zooming method and lens configuration of each lens unit as described above, it is made possible to achieve a zoom lens having a variable magnification range of about 2.6 to 2.9 and an increased angle of field to about 60 to 74 degrees at the wide-angle end, with the total length of the complete lens shortened, while still maintaining high optical performance stable throughout the entire variable magnification range.

Further, in the present embodiment, to further improve the aberration correction, it is preferable to satisfy at least one of the following conditions:

(i) As the second lens unit L2 comprises two lenses, i.e., a positive first lens and a negative second lens, and when letting the Abbe number of the first lens be denoted by v21 and the Abbe number of the material of the transparent resin by vA1, $$10 - vA1 - v21 < 30 \tag{1}$$

is satisfied.

The inequalities of condition (1) give a proper range for the Abbe number of the material of the aspheric surface layer made of transparent resin applied to a lens surface of the second lens unit L2, and have an aim chiefly to correct well image surface characteristics and chromatic aberrations due to variation of magnification.

When the upper limit of the condition (1) is exceeded, as this implies that the material of the positive first lens has too small an Abbe number, a glass material of high refractive index must be used in the lens on which the aspheric surface layer is to be formed. As a result, the Petzval sum becomes too small. So, it becomes difficult to correct well astigmatism. Conversely when the Abbe number of the material of the first lens is too large beyond the lower limit, the variation of longitudinal chromatic aberration due to variation of magnification increases objectionably.

(ii) Letting the axial thickness of the aspheric surface layer be denoted by DA1 and the focal length at the telephoto end of the entire lens system by fT, $$3 \times 10^{-4} < DA1/fT < 2 \times 10^{-3} \qquad (2)$$

is satisfied.

The inequalities of condition (2) give a proper range for the axial thickness of the aspheric surface layer and have aims to assure good stability of application of the layer to the lens surface made of glass material and, on setting of the applied layer, to correct well certain aberrations.

When the upper limit of the condition (2) is exceeded, as this implies that the axial thickness is too thick, it becomes difficult to obtain the aspheric surface of the predetermined shape. When the axial thickness is too thin beyond the lower limit, the intimacy to the glass material becomes worse. So, the aspheric surface of the predetermined shape is hardly produced.

(iii) Letting the image forming magnifications for the wide-angle end and the telephoto end of the second lens unit L2 be denoted by $\beta 2W$ and $\beta 2T$, respectively, $$1.8 < \beta 2T \beta 2W < 4 \qquad (3)$$

is satisfied.

The inequalities of condition (3) give a proper range for the ratio of the image forming magnifications for the wide-angle end and the telephoto end of the second lens unit L2 and have an aim to obtain a predetermined zoom ratio advantageously with the limitation of the size of the entire lens system to a minimum. When the upper limit of the condition (3) is exceeded, it becomes easier to increase the variable magnification ratio, but the variation of all aberrations due to variation of magnification comes to increase largely. When the lower limit is exceeded, the aberrations vary to lesser extent during variation of magnification, but it becomes difficult to increase the variable magnification ratio.

It should be noted that, in the invention, to further improve the aberration correction, while securing the predetermined variable magnification ratio, the numerical ranges of the above-described conditions are preferably set forth as follows:

$$13 < \nu A1 - \nu 21 < 22 \qquad (1a)$$

$$4 \times 10^{-4} < DA1/fT < 8 \times 10^{-4} \qquad (2a)$$

$$2.3 < \beta 2T/\beta 2W < 3.2 \qquad (3a)$$

Next, the numerical examples 1 to 4 of the invention are shown. In the numerical data for the examples 1 to 4, Ri is the radius of curvature of the i-th lens surface, when counted from the object side, Di is the axial i-th lens thickness or air separation, when counted from the object side, and Ni and $\nu i$ are respectively the refractive index and Abbe number of the glass of the i-th lens element, when counted from the object side. The values of the factors in the above-described conditions for the numerical examples 1 to 4 are listed in Table-1. The shape of the aspheric surface is expressed in the coordinates with an X axis in the axial direction and an H axis in the direction perpendicular to an optical axis, the direction in which light advances being taken as positive, by the following equation:

$$X = \frac{(1/R) H^2}{1 + \sqrt{1 - (1+K)(H/R)^2}} + AH^2 + BH^4 + CH^6 + DH^8 + EH^{10}$$

where R is the radius of the osculating sphere, and K, A, B, C, D and E are the aspheric coefficients. Notation: "e-0X" means "$\times 10^{-X}$."

(Numerical Example 1)
f = 39.20–101.50   FNo = 3.91–10.13   $2\omega$ = 57.8°–24.1°

| | | | | | | | |
|---|---|---|---|---|---|---|---|
| R 1 = | 22.16 | D 1 = | 1.80 | N 1 = | 1.51741 | $\nu$ 1 = | 52.4 |
| R 2 = | 32.05 | D 2 = | 1.02 | | | | |
| R 3 = | −23.99 | D 3 = | 1.50 | N 2 = | 1.80516 | $\nu$ 2 = | 25.4 |
| R 4 = | −47.50 | D 4 = | 3.28 | | | | |
| R 5 = | −81.27 | D 5 = | 2.00 | N 3 = | 1.48749 | $\nu$ 3 = | 70.2 |
| R 6 = | −23.77 | D 6 = | 0.28 | | | | |
| R 7 = | −62.51 | D 7 = | 3.00 | N 4 = | 1.48749 | $\nu$ 4 = | 70.2 |
| R 8 = | −12.42 | D 8 = | 0.50 | | | | |
| R 9 = | (Stop) | D 9 = | Variable | | | | |
| R10 = | −41.40 | D10 = | 3.61 | N 5 = | 1.62004 | $\nu$ 5 = | 36.3 |
| R11 = | −15.32 | D11 = | 3.04 | | | | |
| R12 = | −9.80 | D12 = | 0.05 | N 6 = | 1.52421 | $\nu$ 6 = | 51.4 |
| R13 = | −11.60 | D13 = | 1.30 | N 7 = | 1.80400 | $\nu$ 7 = | 46.6 |
| R14 = | −246.24 | | | | | | |

| Variable | Focal Length | | |
|---|---|---|---|
| Separation | 39.20 | 48.65 | 101.50 |
| D 9 | 11.18 | 8.32 | 2.13 |

-continued

Aspheric Coefficients:

| | Surface | |
|---|---|---|
| | R 4 | R12 |
| K | — | −4.134 e-02 |
| A | 0 | 0 |
| B | 9.410 e-05 | 8.892 e-05 |
| C | 6.894 e-07 | 1.360 e-06 |
| D | 6.443 e-09 | −1.373 e-08 |
| E | 0 | 2.038 e-10 |

(Numerical Example 2)
f = 39.20–101.50   FNo. 3.91–10.13   $2\omega = 57.8°–24.1°$

| R 1 = | 22.54 | D 1 = | 1.80 | N 1 = | 1.68893 | ν 1 = | 31.1 |
|---|---|---|---|---|---|---|---|
| R 2 = | 34.05 | D 2 = | 1.29 | | | | |
| R 3 = | −17.71 | D 3 = | 1.50 | N 2 = | 1.80518 | ν 2 = | 25.4 |
| R 4 = | −41.75 | D 4 = | 2.71 | | | | |
| R 5 = | −690.00 | D 5 = | 2.00 | N 3 = | 1.48749 | ν 3 = | 70.2 |
| R 6 = | −20.85 | D 6 = | 0.50 | | | | |
| R 7 = | −100.67 | D 7 = | 2.50 | N 4 = | 1.48749 | ν 4 = | 70.2 |
| R 8 = | −14.36 | D 8 = | 0.50 | | | | |
| R 9 = | (Stop) | D 9 = | Variable | | | | |
| R10 = | −43.80 | D10 = | 0.05 | N 5 = | 1.52421 | ν 5 = | 51.4 |
| R11 = | −110.00 | D11 = | 2.83 | N 6 = | 1.69894 | ν 6 = | 30.1 |
| R12 = | −23.92 | D12 = | 3.75 | | | | |
| R13 = | −10.59 | D13 = | 1.30 | N 7 = | 1.80400 | ν 7 = | 46.6 |
| R14 = | −61.58 | | | | | | |

| Variable | Focal Length | | |
|---|---|---|---|
| Separation | 39.20 | 48.61 | 101.50 |
| D 9 | 11.82 | 7.97 | 1.78 |

Aspheric Coefficients:

| | Surface | |
|---|---|---|
| | R 4 | R10 |
| A | 0 | 0 |
| B | 6.836 e-05 | 7.320 e-05 |
| C | 5.162 e-07 | 3.840 e-07 |
| D | 1.651 e-09 | 2.948 e-10 |
| E | 0 | 2.505 e-11 |

(Numerical Example 3)
f = 39.20–111.50   FNo. = 36.0–10.24   $2\omega = 57.8°–22.0°$

| R 1 = | 28.45 | D 1 = | 1.80 | N 1 = | 1.64768 | ν 1 = | 33.8 |
|---|---|---|---|---|---|---|---|
| R 2 = | 63.65 | D 2 = | 1.09 | | | | |
| R 3 = | −23.68 | D 3 = | 1.50 | N 2 = | 1.84665 | ν 2 = | 23.8 |
| R 4 = | −55.69 | D 4 = | 3.98 | | | | |
| R 5 = | −104.45 | D 5 = | 2.00 | N 3 = | 1.48749 | ν 3 = | 70.2 |
| R 6 = | −22.27 | D 6 = | 0.10 | | | | |
| R 7 = | −97.70 | D 7 = | 3.00 | N 4 = | 1.48749 | ν 4 = | 70.2 |
| R 8 = | −15.01 | D 8 = | 0.50 | | | | |
| R 9 = | (Stop) | D 9 = | Variable | | | | |
| R10 = | −44.13 | D10 = | 0.05 | N 5 = | 1.52421 | ν 5 = | 51.4 |
| R11 = | −110.00 | D11 = | 2.83 | N 6 = | 1.68093 | ν 6 = | 31.1 |
| R12 = | −24.34 | D12 = | 3.75 | | | | |
| R13 = | −10.73 | D13 = | 1.30 | N 7 = | 1.80400 | ν 7 = | 46.6 |
| R14 = | −61.58 | | | | | | |

| Variable | Focal Length | | |
|---|---|---|---|
| Separation | 39.20 | 50.33 | 111.50 |
| D 9 | 11.69 | 8.33 | 1.85 |

-continued

Aspheric Coefficients:

| | Surface | |
|---|---|---|
| | R 4 | R10 |
| A | 0 | 0 |
| B | 5.777 e-05 | 7.221 e-05 |
| C | 3.386 e-07 | 3.289 e-07 |
| D | 2.875 e-09 | 1.267 e-09 |
| E | 0 | 1.935 e-11 |

(Numerical Example 4)
f = 28.93–78.00  FNo. = 3.60–9.71  2ω = 73.6°–31.0°

| R 1 = | 32.42 | D 1 = | 1.50 | N 1 = | 1.51633 | ν 1 = | 64.2 |
|---|---|---|---|---|---|---|---|
| R 2 = | 536.58 | D 2 = | 1.22 | | | | |
| R 3 = | −16.84 | D 3 = | 1.29 | N 2 = | 1.73077 | ν 2 = | 40.6 |
| R 4 = | 146.52 | D 4 = | 2.66 | | | | |
| R 5 = | 370.57 | D 5 = | 2.36 | N 3 = | 1.48749 | ν 3 = | 70.2 |
| R 6 = | −18.03 | D 6 = | 0.50 | | | | |
| R 7 = | 56.80 | D 7 = | 3.27 | N 4 = | 1.48749 | ν 4 = | 70.2 |
| R 8 = | −14.89 | D 8 = | 0.50 | | | | |
| R 9 = | (Stop) | D 9 = | Variable | | | | |
| R10 = | −29.76 | D10 = | 0.05 | N 5 = | 1.52421 | ν 5 = | 51.4 |
| R11 = | −100.00 | D11 = | 3.10 | N 6 = | 1.62004 | ν 6 = | 36.3 |
| R12 = | −18.12 | D12 = | 3.75 | | | | |
| R13 = | −10.40 | D13 = | 1.30 | N 7 = | 1.80609 | ν 7 = | 41.0 |
| R14 = | −67.66 | | | | | | |

| Variable Separation | Focal Length | | |
|---|---|---|---|
| | 28.93 | 56.90 | 78.00 |
| D 9 | 12.56 | 4.49 | 2.23 |

Aspheric Coefficients:

| | Surface | |
|---|---|---|
| | R 4 | R10 |
| A | 0 | 0 |
| B | 9.000 e-05 | 6.283 e-05 |
| C | 8.511 e-07 | 1.671 e-07 |
| D | −1.450 e-09 | 5.504 e-10 |
| E | 0 | 4.164 e-11 |

TABLE 1

| | Numerical Example | | | |
|---|---|---|---|---|
| Condition | 1 | 2 | 3 | 4 |
| (1) νA1-ν21 | 15.1 | 21.3 | 20.3 | 15.1 |
| (2) DA1/fT | $4.9 \times 10^{-4}$ | $4.9 \times 10^{-4}$ | $4.5 \times 10^{-4}$ | $6.4 \times 10^{-4}$ |
| (3) β2T/β2W | 2.59 | 2.59 | 2.84 | 2.70 |

As is understandable from the foregoing embodiments, in the so-called 2-unit zoom lens, the form and the construction and arrangement of the constituent lenses of each lens unit are appropriately determined and, in particular, an aspheric surface layer made of transparent resin is applied to at least one of the surfaces in the second lens unit L2 of negative refractive power to thereby correct well the variation of aberrations, particularly chromatic aberrations, due to variation of magnification. It is, therefore, made possible to achieve a zoom lens having a variable magnification range of about 2.6 to 2.9 and an increased angle of field to about 60 to 74 degrees at the wide-angle end, with the total length of the complete lens shortened, while still maintaining high optical performance stable throughout the entire variable magnification range.

What is claimed is:

1. A zoom lens comprising:
    a first lens unit having a positive refractive power; and
    a second lens unit located on an image side of said first lens unit and having a negative refractive power,
    wherein magnification is varied by varying a separation between said first lens unit and said second lens unit, and
    wherein an aspheric surface layer made of resin and having an aspheric surface is formed on a surface of an object side of a glass lens of said second lens unit, and
    wherein said zoom lens satisfies the following condition:

$$3 \times 10^{-4} < DA1/fT < 2 \times 10^{-3}$$

where DA1 is the axial thickness of said aspheric surface layer, and fT is the focal length at a telephoto end of the entire zoom lens.

2. A zoom lens according to claim 1, wherein said second lens unit comprises, in order from the object side, a first lens having a positive refractive power and a second lens having a negative refractive power, wherein said aspheric surface layer is formed on a surface of the object side of said first lens, and wherein the following condition is satisfied:

$$10 < \nu A1 - \nu 21 < 30$$

where ν21 is the Abbe number of said first lens, and νA1 is the Abbe number of said aspheric surface layer.

3. A zoom lens according to claim 2, further satisfying the following condition:

$$13 < \nu A1 - \nu 21 < 22.$$

4. A zoom lens according to claim 1, further satisfying the following condition:

$$4 \times 10^{-4} < DA1/fT < 8 \times 10^{-4}.$$

5. A zoom lens according to claim 1, satisfying the following condition:

$$1.8 < \beta 2T/\beta 2W < 4$$

where β2W and β2T are the image forming magnifications for a wide-angle end and a telephoto end of said second lens unit, respectively.

6. A zoom lens according to claim 5, further satisfying the following condition:

$$2.3 < \beta 2T/\beta 2W < 3.2.$$

7. A zoom lens according to claim 1, wherein said second lens unit comprises, in order from the object side, a first lens having a positive refractive power and a second lens having a negative refractive power, wherein said aspheric surface layer is formed on a surface of the object side of said first lens, and wherein the following conditions are satisfied:

$$10 < \nu A1 - \nu 21 < 30$$

$$1.8 < \beta 2T/\beta 2W < 4$$

where ν21 is the Abbe number of said first lens, νA1 is the Abbe number of paid aspheric surface layer, and β2W and β2T are the image forming magnifications for a wide-angle end and a telephoto end of said second lens unit, respectively.

8. A zoom lens according to claim 1, wherein said first lens unit comprises, in order from the object side, a positive lens having a convex surface facing the object side, a negative lens having a concave surface facing the object side, and two positive lenses having respective convex surfaces facing the image side, and said second lens unit comprises, in order from the object side, a positive meniscus lens convex toward the image side and a negative meniscus lens convex toward the image side.

9. A zoom lens comprising:

a first lens unit having a positive refractive power; and a second lens unit located on an image side of said first lens unit and having a negative refractive power, wherein magnification is varied by varying a separation between said first lens unit and said second lens unit, and wherein an aspheric surface layer made of resin and having an aspheric surface is formed on a surface of an object side of a glass lens of said second lens unit, wherein said second lens unit comprises, in order from the object side, a first lens having a positive refractive power and a second lens having a negative refractive power, wherein said aspheric surface layer is formed on a surface of the object side of said first lens, and wherein the following conditions are satisfied:

$$10 < \nu A1 - \nu 21 < 30$$

$$3 \times 10^{-4} < DA1/fT < 2 \times 10^{-3}$$

where ν21 is the Abbe number of said first lens, νA1 is the Abbe number of said aspheric surface layer, DA1 is the axial thickness of said aspheric surface layer, and fT is the focal length at a telephoto end of the entire zoom lens.

10. A zoom lens according to claim 9, satisfying the following condition:

$$1.8 < \beta 2T/\beta 2W < 4$$

where β2W and β2T are the image forming magnifications for a wide-angle end and the telephoto end of said second lens unit, respectively.

11. A zoom lens according to claim 9, wherein said first lens unit comprises, in order from the object side, a positive lens having a convex surface facing the object side, a negative lens having a concave surface facing the object side, and two positive lenses having respective convex surfaces facing the image side, and said second lens unit comprises, in order from the object side, a positive meniscus lens convex toward the image side and a negative meniscus lens convex toward the image side.

12. A zoom lens comprising:

a first lens unit having a positive refractive power; and a second lens unit located on an image side of said first lens unit and having a negative refractive power, wherein magnification is varied by varying a separation between said first lens unit and said second lens unit, and wherein an aspheric surface layer made of resin and having an aspheric surface is formed on a surface of an object side of a glass lens of said second lens unit, wherein said second lens unit comprises, in order from the object side, a first lens having a positive refractive power and a second lens having a negative refractive power, wherein said aspheric surface layer is formed on a surface of the object side of said first lens, and wherein the following conditions are satisfied:

$$3 \times 10^{-4} < DA1/fT < 2 \times 10^{-3}$$

$$1.8 < \beta 2T/\beta 2W < 4$$

where DA1 is the axial thickness of said aspheric surface layer, fT is the focal length at a telephoto end of the entire zoom lens, and β2W and β2T are the image forming magnifications for a wide-angle end and the telephoto end of said second lens unit, respectively.

13. A zoom lens according to claim 12, wherein said second lens unit comprises, in order from the object side, a first lens having a positive refractive power and a second lens having a negative refractive power, wherein said aspheric surface layer is formed on a surface of the object side of said first lens, and wherein the following condition is satisfied:

$$10 < \nu A1 - \nu 21 - 30$$

where ν21 is the Abbe number of said first lens, and νA1 is the Abbe number of said aspheric surface layer.

14. A zoom lens according to claim 13, further satisfying the following condition:

$$13 < \nu A1 - \nu 21 < 22.$$

15. A zoom lens according to claim 12, wherein said first lens unit comprises, in order from the object side, a positive lens having a convex surface facing the object side, a negative lens having a concave surface facing the object side, and two positive lenses having respective convex surfaces facing the image side, and said second lens unit comprises, in order from the object side, a positive meniscus lens convex toward the image side and a negative meniscus lens convex toward the image side.

16. A zoom lens comprising:

a first lens unit having a positive refractive power and having, in order from an object side, a positive lens having a convex surface facing the object side, a negative lens having a concave surface facing the object side, and two positive lenses having respective convex surfaces facing an image side; and a second lens unit located on the image side of said first lens unit, having a negative refractive power and having, in order from the object side, a positive meniscus lens convex toward the image side and a negative meniscus lens convex toward the image side, wherein an aspheric surface layer made of resin and having an aspheric surface is formed on a surface of the object side of one of said positive meniscus lens and said negative meniscus lens, wherein magnification is varied by varying a separation between said first lens unit and said second lens unit, and wherein, letting the Abbe number of said positive meniscus lens be denoted by ν21, the Abbe number of said aspheric surface layer by νA1, the axial thickness of said aspheric surface layer by DA1, the focal length at a telephoto end of the entire zoom lens by fT, and the image forming magnifications for a wide-angle end and the telephoto end of said second lens unit by β2W and β2T, respectively, the following conditions are satisfied:

$$10<\nu A1-\nu 21<30$$

$$3\times 10^{-4}<DA1/fT<2\times 10^{-3}$$

$$1.8<\beta 2T/\beta 2W<4.$$

17. A zoom lens according to claim 16, further satisfying the following conditions:

$$13<\nu A1-\nu 21<22$$

$$4\times 10^{-4}<DA1/fT<8\times 10^{-4}$$

$$2.3<\beta 2T/\beta 2W<3.2.$$

18. An image forming optical system comprising:

a first lens unit having a positive refractive power; and a second lens unit located on an image side of said first lens unit and having a negative refractive power, wherein an aspheric surface layer having an aspheric surface is formed on a surface of a certain lens of said optical system, and wherein said image forming optical system satisfies the following condition:

$$3\times 10^{-4}<DA1/fT<2\times 10^{-3}$$

where DA1 is the axial thickness of said aspheric surface layer, and fT is the focal length at a telephoto end of the entire image forming optical system.

19. An optical system according to claim 18, wherein said certain lens is made of glass, and said aspheric surface layer is made of resin.

20. An optical system according to claim 18, wherein said certain lens belongs to said second lens unit.

21. An optical system according to claim 18, wherein said aspheric surface layer is formed on a surface of an object side of said certain lens.

22. An optical system according to claim 18, wherein a separation between said first lens unit and said second lens unit is varied to thereby vary an image forming magnification.

23. An optical system according to claim 18, wherein said certain lens is made of glass and said aspheric surface layer is made of resin, and a separation between said first lens unit and said second lens unit is varied to thereby vary an image forming magnification.

24. An optical system according to claim 23, wherein said aspheric surface layer is formed on a surface of an object side of said certain lens.

25. An optical system according to claim 18, wherein said certain lens belongs to said second lens unit, and a separation between said first lens unit and said second lens unit is varied to thereby vary an image forming magnification.

26. An optical system according to claim 25, wherein said certain lens is made of glass and said aspheric surface layer is made of resin.

27. An optical system according to claim 18, wherein said aspheric surface layer is formed on a surface of an object side of said certain lens, and a separation between said first lens unit and said second lens unit is varied to thereby vary an image forming magnification.

28. An optical system according to claim 27, wherein said certain lens belongs to said second lens unit.

* * * * *

UNITED STATES PATENT AND TRADEMARK OFFICE
CERTIFICATE OF CORRECTION

PATENT NO. : 5,687,027
DATED : November 11, 1997
INVENTOR(S) : Yoshinori ITOH

It is certified that error appears in the above-identified patent and that said Letters Patent is hereby corrected as shown below:

COLUMN 1

Line 51, "Unit" should read --unit--.

COLUMN 5

Line 39, "$1.8<\beta 2T\beta 2W<4$" should read --$1.8<\beta 2T/\beta 2W<4$--.

COLUMN 7

Line 33, "11.82" should read --10.82--.

COLUMN 11

Line 3, "leas" should read --lens--; and
Line 25, "1,." should read --1,--.

Signed and Sealed this

Twenty-fifth Day of August, 1998

Attest:

BRUCE LEHMAN

*Attesting Officer*  *Commissioner of Patents and Trademarks*